US006111177A

United States Patent [19]

Pattillo

[11] Patent Number: 6,111,177

[45] Date of Patent: Aug. 29, 2000

[54] SLIDE BAR DEVICES AND ASSEMBLIES

[76] Inventor: Joseph L. Pattillo, 114 W. Mariposa, #A, San Clemente, Calif. 92672

[21] Appl. No.: 09/127,880

[22] Filed: Jul. 31, 1998

[51] Int. Cl.[7] ................................ G01D 3/00; G01D 3/16

[52] U.S. Cl. ................................ 84/315; 84/320; 84/322

[58] Field of Search .............................. 84/315, 319–322

[56] References Cited

U.S. PATENT DOCUMENTS

| | | | |
|---|---|---|---|
| 1,837,270 | 12/1931 | Kailimai . | |
| 2,248,542 | 7/1941 | McDaniel et al. | 84/319 |
| 4,328,733 | 5/1982 | Smith | 84/319 |
| 4,522,101 | 6/1985 | Peavey et al. | 84/1.16 |
| 4,790,232 | 12/1988 | Rosen | 84/329 |
| 4,817,488 | 4/1989 | De Los Santos | 84/319 |
| 5,488,891 | 2/1996 | Baker | 84/319 |

OTHER PUBLICATIONS

Axys Reversible Guitar Slide, Jul. 11, 1998 Http:///www.sixthfinger.com/main.html Sixth Finger Music Co., 3 pages.

*Primary Examiner*—Bentsu Ro
*Assistant Examiner*—Marlon T. Fletcher
*Attorney, Agent, or Firm*—F. Eugene Logan

[57] ABSTRACT

Slide bars are used by musicians when playing string instruments to achieve different effects and sounds to stylize their musical compositions Existing slide bars, when not use, are usually removed, or rotate with difficulty around the finger, to continue play thereby interrupting play for a short, but discernible, period of time The slide bar devices and assemblies of this invention are easy to use and reduce down time to a non-discernible degree The slide bar device has a slide member with a longitudinal axis and an outer surface for contacting all of the strings of the string instrument. A ring member is attached to the slide member and adaptable for wear around any of the musician's fingers. The axis of the ring member is parallel to, and spaced away from, the axis of the slide member The center of gravity of the slide member is spaced away from, and radially outward of, the ring member. The ring member is sized to rotate freely on the finger and has a length such that when the slide bar device is over the finger, the ring member does not interfere with bending both phalange joints of the finger thereby enabling the musician to finger the strings to the same extent as if the slide bar device were not present. Flipping motions of the hand quickly rotates the slide member from over to under to over the finger. Sleeves, mounted on over the slide members, produce yet other sounds. The slide members can be made of any metal and the sleeves of any different metal glass ceramic or plastic.

21 Claims, 2 Drawing Sheets

SLIDE BAR DEVICES AND ASSEMBLIES

BACKGROUND OF THE INVENTION

Slide bars are used by musicians when playing string instruments to achieve a different effect and sound to stylize their version of musical compositions. Usually slide bars must be set aside or removed from the musicians' hands to continue playing the string instruments when not using the slide bars. In either event, musicians must interrupt their play during such times to pick up, or to set aside, or to put on, or to take off slide bars. To reduce such down time slide bars are sometimes held by a bracket mounted on the string instrument or, alternately, are movable about a finger or hand. Unfortunately, although with some of these devices down time may be somewhat reduced, they are either to difficult to use and/or still require an undesirable amount of down time. One solution, of course, is to have two musicians so that play is not interrupted. While this solution may be acceptable, it of course raises the cost, and is not acceptable for solo performing musicians. Therefore, there is a need for a slide bar device which is easy to use and greatly reduces down time, especially to a non-discernible level.

SUMMARY OF THE INVENTION

This invention is directed towards slide bar devices which are easy to use and greatly reduce down time. This invention is also directed towards slide bar assemblies which provide means for altering the sounds produced by such slide bar devices without the need to provide numerous slide bar devices for such varied musical effects.

Accordingly, there is provided by the principles of this invention a slide bar device for use by a musician when playing a string instrument comprising a slide member having a longitudinal axis and an outer surface having a length effective for contacting all of the strings of the string instrument. A ring member is attached to the slide member and adaptable for removable insertion around any one of the musician's fingers. The ring member has a longitudinal axis which is approximately parallel to, and spaced away from, the axis of the slide member.

In one embodiment, the slide member has a mass sufficient to enable the musician to easily flip or spin the slide member around the musician's finger from a slide-to-string contacting position under the musician's finger to a slide-to-string non-contacting position over the musician's finger with a flipping motion of the musician's hand, and from the slide-to-string non-contacting position over the musician's finger to the slide-to-string contacting position under the musician's finger also with a flipping motion of the musician's hand.

In another embodiment, the outer surface of the slide member is cylindrical. In still another embodiment, the slide member is an annulus. In yet another embodiment, the slide member is a solid bar to increase the mass thereof.

In one embodiment, to facilitate flipping slide member around the musician's finger, the ring member is sized to rotate freely on the musician's finger. In another embodiment, the ring member has a circular inside diameter and a circular outside diameter. In still another embodiment, the ring member has a length such that when the slide bar device is in a slide-to-string non-contacting position over the musician's finger, the ring member does not interfere with bending both phalange joints of the musician's finger to the same extent that the phalange joints could be bent if the slide bar device were not being used when playing the string instrument. In this position it can be appreciated that the slide bar device does not interfere with playing the string instrument regardless of which finger the ring member is on. In another embodiment, the ring member is attached to the slide member at a point from one end thereof at a distance of from about 30% to about 70% of the length of the slide member. In still another embodiment, the ring member is attached to the slide member at a point on the middle third of the longitudinal length of the slide member. In yet another embodiment, the ring member is attached to the slide member at about midpoint of the length of the slide member. In such embodiments the mass of the slide member is better balanced around the ring member thereby enabling it to spin more easier than if the ring member were attached to the end of the slide member.

For cosmetic purposes as well as other effects, the ring member may be made of a precious metal such as gold, silver or platinum.

In one embodiment, the slide bar device further comprising a sleeve for removable insertion over the slide member. The sleeve is for producing a sound which is different than the sound produced by the slide bar device without the sleeve. In another embodiment, the slide member is of a first material composition and the sleeve is of a second material composition which is different than the first material composition. In a further embodiment, the first composition is selected from the group consisting of copper, bronze, brass, steel, nickel, chromium, silver and gold; and the second composition is selected from the group consisting of copper, bronze, brass, steel, nickel, chromium, silver, gold, glass, ceramic and plastic.

Non-limiting examples of string instruments in which this invention may be used may be selected from the group consisting of guitars, Spanish guitars, Hawaiian guitars, bass guitars, country lap guitars, pancake guitars, acoustical guitars, electric guitars, banjos, ukuleles and other guitar like instrument.

In one embodiment, especially useful where the string instrument is a guitar, the length of the slide member is from about 4 cm (centimeter) to about 8 cm. In another embodiment, the slide member has a mass of from about 10 grams to about 100 grams. In still another embodiment, the slide member has a mass of from about 20 grams to about 60 grams.

In one embodiment, the ring member has a longitudinal length of from about 2 mm (millimeter) to about 15 mm. In another embodiments the slide member is spaced away from the ring member in a radial direction, and in still another embodiment, the axis of the ring member is spaced away from the axis of the slide member a distance from about 1 cm to about 3 cm. In such embodiments the mass of the slide member facilitates its rotation about the finger because the center of gravity of the slide member is at a greater radial distance away from the finger than if the slide member merely surrounded a circumferential portion of the finger.

DESCRIPTION OF THE PREFERRED EMBODIMENTS

Figure 1:
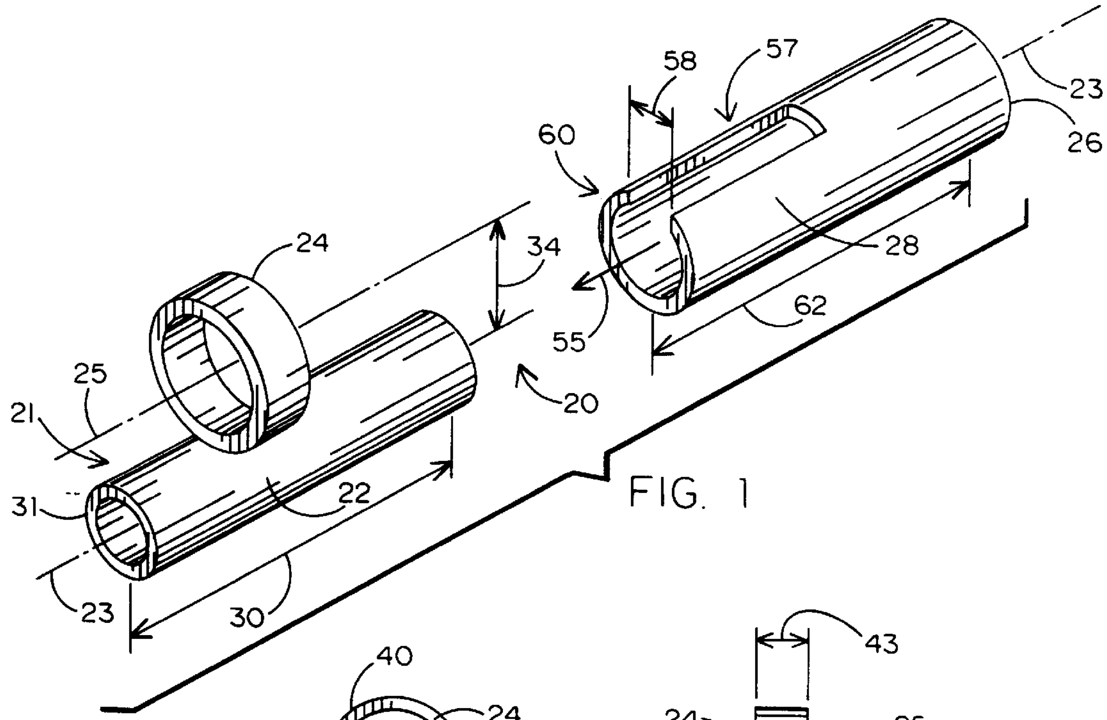
FIG. 1 is an explosive side and front perspective view of a slide bar assembly featuring a slide bar device and a removable sound modifying sleeve.
Figure 3:
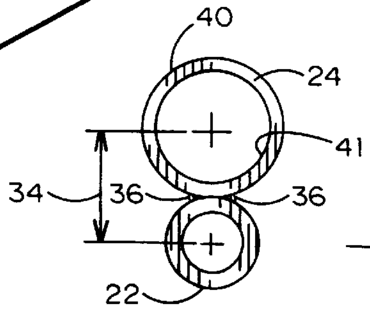
FIG. 3 is a front view of the slide bar device of FIG. 1.
Figure 2:
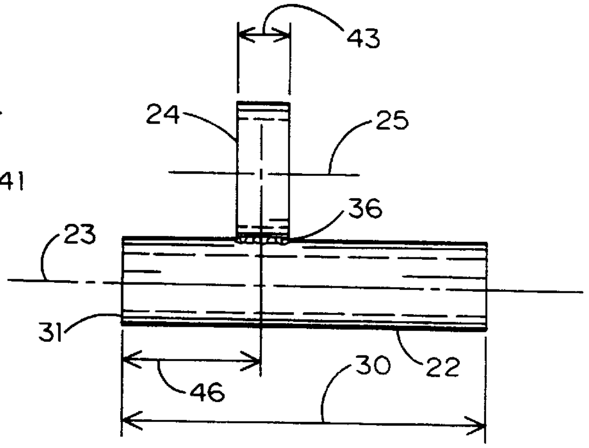
FIG. 2 is a side view of the slide bar device of FIG. 1.
Figure 5:
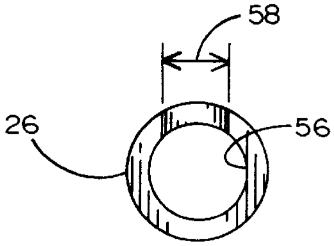
FIG. 5 is a front view of the removable sound modifying sleeve of FIG. 1.
Figure 4:
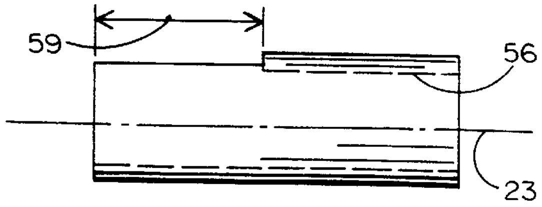
FIG. 4 is a side view of the removable sound modifying sleeve of FIG. 1.

Referring now to the figures, and particularly FIGS. 1–5, a slide bar assembly 20 is shown having a slide bar device 21 having as its principal parts a slide member 22 and a ring member 24, and a removable sound modifying sleeve 26. Slide member 22 preferably has an annular or tubular configuration made from a metal, preferably bronze. Slide member 22 also preferably has a cylindrical outside diameter 28. The length 30 of slide member 22 is long enough to span all strings 32 of the particular string instrument (not shown in the figures) for which slide bar device 21 will be used. Usually length 30 is from about 4 cm to about 8 cm.

Figure 7:
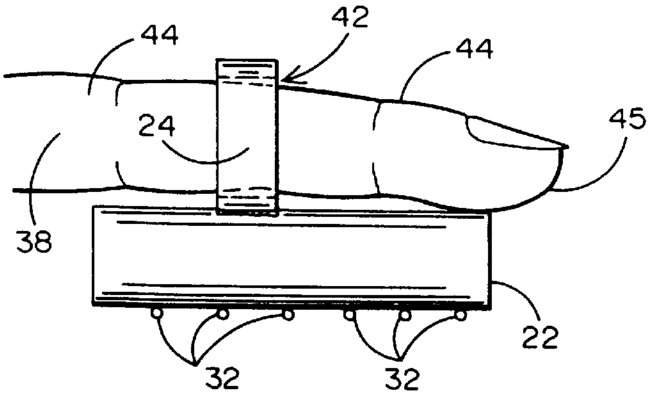
FIG. 7 is a side view of the slide bar device of FIGS. 1 and 6 showing the device in a slide-to-string contacting position under a finger of the user with the slide member in contact with all strings of a string instrument.
Figure 8:
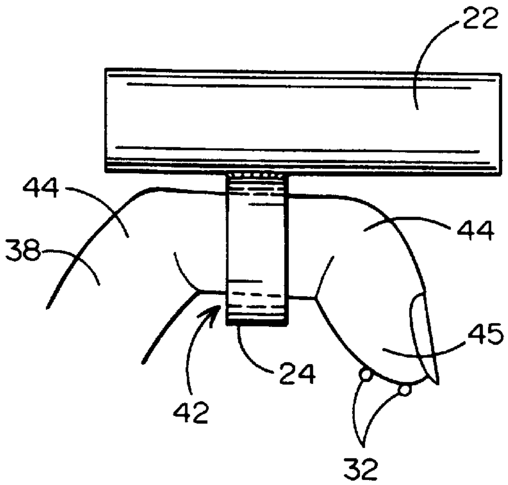
FIG. 8 is a side view of the slide bar device of FIGS. 1 and 6 showing the device in a slide-to-string non-contacting position over a finger of the user with the finger in contact with a string of the string instrument

Ring member 24, preferably made from a metal, is attached, preferably permanently, to slide member 22 by soldering, preferably by silver solder 36. Axis 25 of ring member 24 is parallel to, and spaced away from, axis 23 of the slide member 22 as indicated by distance 34. In one embodiment of this invention distance 34 is from about 1 cm to about 3 cm. Ring member 24 is sized to fit freely on the user's finger so that the ring member can rotate freely when changing the position of slide member 22 from over to under to over the finger. To further facilitate flipping slide bar device 21 about the user's finger 38, ring member 24 has both a cylindrical outside diameter 40 and a cylindrical inside diameter 41 with the inside diameter sized to spin freely about the user's finger 38; see FIGS. 7 and 8. As shown in FIGS. 7 and 8, a small clearance 42 is preferably provided between the user's finger 38 and ring member 24 for this purpose. So that slide bar device 22 will spin freely on finger 38, ring member 24 has a longitudinal length 43 of from about 2 mm to about 15 mm, and preferably from about 2 mm to about 10 mm so that when the slide bar device is in a slide-to-string non-contacting position over the user's finger 38 as shown in FIG. 8, the ring member 24 does not interfere with bending both phalange joints 44 of the user's finger 38 to the same extent that the phalange joints 44 could be bent if the slide bar device were not present when playing the string instrument. In one embodiment ring member 24 is attached to slide member 22 at a point from the front end 31 thereof of from about 30% to about 70% of length 30 of slide member 22 as shown by length 46 in FIG. 2.

When the user wishes to use the slide bar device 21, the device is flipped or spun under the user's finger 38 so that all of the strings 32 of the string instrument are contacted by the slide member 22 as shown in FIG. 7. When the user's does not wish to use the slide bar device 21 for sliding along the instrument's strings, the slide member is flipped or spun over the finger 38 so that the user can contact a certain string or strings 32 directly with the user's finger tip 45 as shown in FIG. 8.

Figure 6:
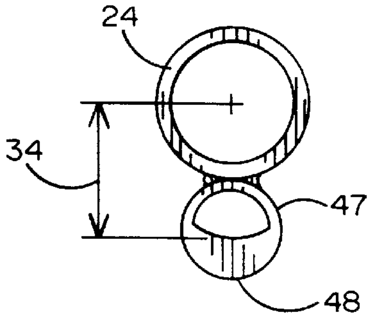
FIG. 6 is a front view of another embodiment of a slide bar device.

In another embodiment, to maximize the inertial force for 8 quickly flipping the slide member between the under and over the user's fingers, a slide member 47 can have most of its mass, for example portion 48, concentrated as far away as possible from axis 25 of ring member 24 as shown FIG. 6. In yet another embodiment, slide member 22 can be solid rather than annular to increase its mass and thereby its inertia when flipping from under to over, and from over to under, the user's finger 38. In one embodiment the mass of slide member 22 is from about 10 grams to about 100 grams. With a little practice the user can readily develop a quick flipping motion with his fretting hand that will flip slide member 22 or 47 almost instantaneously from under to over the user's finger and from over to under the user's finger so that playing of the string instrument will not be interrupted for a discernible period of time. This provides a distinct advantage over other slide bars that either must be removed from the user's fretting hand with the picking or non-fretting hand, or by deliberate rotation using the thumb on the fretting hand.

Figure 9:
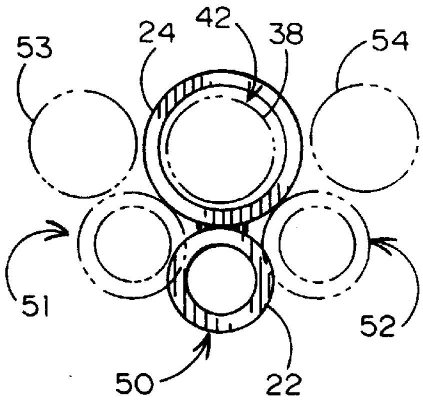
FIG. 9 is a rearwardly facing cross-sectional view of the slide bar device in three possible positions under the user's fingers.

One advantage of having a slide member with a cylindrical outside diameter is that the slide member 22 can readily contact all of the strings 32 of a string instrument regardless of whether slide member 22 lies precisely directly under the user's finger 38 as shown by FIG. 7 and by position 50 in FIG. 9, or the slide member 22 is lodged partly to the left or right of the user's finger 38 so that the slide member 22 lies comfortably under, and abuts, two of the user's fingers as shown in position 51 in which slide member 22 abuts fingers 53 and 38, and position 52 in which slide member 22 abuts fingers 38 and 54 as shown in FIG. 9.

Although the slide bar devices of this invention have been illustrated as being worn on one of the middle fingers of the user, the devices can be worn on any finger. Accordingly, the user has the option of wearing the devices on that finger which the user finds is best for him or her. Furthermore, the devices can be used by both left and right handed persons without the need for a left hand model and a right hand model.

To provide a variety of different sounds when using slide bar device 21, a removable sound modifying sleeve 26 is slid over slide member 22 in the direction of arrow 55 of FIG. 1. Removable sound modifying sleeve 26 has an inside diameter 56 adaptable for sliding over outside diameter 28 of slide member 22. A front notch 57 having width 58 and length 59 is provided and is adaptable for allowing the front portion 60 of sleeve 26 to slide past ring member 24. Longitudinal length 62 of sleeve 26 is approximately the same as length 30 of slide member 22. To achieve different sounds, sleeves 26 can be made from a variety of materials of which non-limiting examples are copper, bronze, brass, steel, nickel, chromium, silver, gold, glass, ceramic and plastic Accordingly, the user can have a number of sleeves 26 made of different materials to achieve the particular sounds desired.

While the preferred embodiments of the present invention have been described, various changes and modifications may be made thereto without departing from the spirit of the invention and the scope of the appended claims the present disclosure and embodiments of this invention described herein are for purposes of illustration and example and modifications and improvements may be made thereto without departing from the spirit of the invention or from the scope of the claims the claims, therefore, are to be accorded a range of equivalents commensurate in scope with the advances made over the art.

What is claimed is:

1. A slide bar device for use by a user when playing a string instrument comprising:

a slide member having a longitudinal axis and an outer surface having a length effective for contacting all of the strings of the string instrument;

a ring member attached to the slide member and adaptable for removable insertion around a finger on a hand of the user, the ring member having a longitudinal axis which is approximately parallel to, and spaced away from, the axis of the slide member, wherein the slide member is for producing a first sound when the slide bar device is used with the string instrument; and a sleeve for removable insertion over the slide member for producing a second sound, when the slide bar device is used with the string instrument, which is different than the first sound.

2. The slide bar device of claim 1, wherein the length of the slide member is from about 4 cm to about 8 cm.

3. The slide bar device of claim 1, wherein the slide member has a mass sufficient to enable the user to easily spin the slide member around the user's finger from a slide-to-string contacting position under the user's finger to a slide-to-string non-contacting position over the user's finger with a flipping motion of the user's hand, and from the slide-to-string non-contacting position over the user's finger to the slide-to-string contacting position under the user's finger also with a flipping motion of the user's hand.

4. The slide bar device of claim 1, wherein the slide member has a mass of from about 10 grams to about 100 grams.

5. The slide bar device of claim 1, wherein the outer surface of the slide member is cylindrical.

6. The slide bar device of claim 1, wherein the slide member is an annulus.

7. The slide bar device of claim 1, wherein the ring member is sized to rotate freely on the user's finger.

8. The slide bar device of claim 1, wherein the ring member has a circular inside diameter and a circular outside diameter.

9. The slide bar device of claim 1, wherein the ring member has a length such that when the slide bar device is in a slide-to-string non-contacting position over the user's finger, the ring member does not interfere with bending both phalange joints of the user's finger to the same extent that the phalange joints could be bent if the slide bar device were not being used when playing the string instrument.

10. The slide bar device of claim 1, wherein the ring member has a longitudinal length of from about 2 mm to about 15 mm.

11. The slide bar device of claim 1, wherein the ring member is attached to the slide member at a point on the middle third of the longitudinal length of the slide member.

12. The slide bar device of claim 1, wherein the ring member is attached to the slide member at about midpoint of the length of the slide member.

13. The slide bar device of claim 1, wherein the slide member is spaced away from the ring member in a radial direction.

14. The slide bar device of claim 1, wherein the slide member has a first material composition; and wherein the sleeve has a second material composition which is different than the first material composition.

15. The slide bar device of claim 14, wherein the first composition is selected from the group consisting of copper, bronze, brass, steel, nickel, chromium, silver and gold; and wherein the second composition is selected from the group consisting of copper, bronze, brass, steel, nickel, chromium, silver, gold, glass, ceramic and plastic.

16. The slide bar device of claim 1, wherein the slide member is an annulus.

17. The slide bar device of claim 15, wherein the ring member is attached to the slide member at a point from an end thereof of from about 30% to about 70% of the length of the slide member, and wherein the ring member has a length such that when the slide bar device is in a slide-to-string non-contacting position over the user's finger, the ring member does not interfere with bending both phalange joints of the user's finger to the same extent that the phalange joints could be bent if the slide bar device were not being used when playing the string instrument.

18. The slide bar device of claim 1, wherein the ring member is attached directly to the outer surface of the slide member without a post therebetween.

19. The slide bar device of claim 1, wherein the ring member has an inside surface which is completely free of obstructions including screw heads.

20. A slide bar assembly for use by a user when playing a string instrument comprising:

a slide bar device which includes a slide member having a longitudinal axis and an outer surface having a length effective for contacting all of the strings of the string instrument, and a ring member attached to the slide member in a non-swivel relationship thereto, and adaptable for removable insertion around a finger on a hand of the user, the ring member having a longitudinal axis which is approximately parallel to, and spaced away from, the axis of the slide member; and a sleeve for removable insertion over the slide member for producing an alternative sound when inserted over the slide member than when not used, and wherein the slide member can be spun around the user's finger from a slide-to-string contacting position under the user's finger to a slide-to-string non-contacting position over the user's finger, and from the slide-to-string non-contacting position over the user's finger to the slide-to-string contacting position under the user's finger.

21. The slide bar device of claim 20, wherein the slide member is an annulus.

* * * * *